(12) United States Patent
Schultz

(10) Patent No.: US 8,501,059 B2
(45) Date of Patent: Aug. 6, 2013

(54) INJECTION UNIT HAVING A FILTER, A METHOD OF CONTROLLING MELT PRESSURE IN ACCORDANCE WITH A TARGET PRESSURE RANGE

(75) Inventor: Gregory Allan Schultz, Bolton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 126 days.

(21) Appl. No.: 13/321,389

(22) PCT Filed: May 28, 2010

(86) PCT No.: PCT/CA2010/000778
§ 371 (c)(1), (2), (4) Date: Nov. 18, 2011

(87) PCT Pub. No.: WO2010/144994
PCT Pub. Date: Dec. 23, 2010

(65) Prior Publication Data
US 2012/0074607 A1 Mar. 29, 2012

Related U.S. Application Data

(60) Provisional application No. 61/218,601, filed on Jun. 19, 2009.

(51) Int. Cl.
*B29C 45/54* (2006.01)
*B29C 45/77* (2006.01)

(52) U.S. Cl.
USPC .............. 264/40.5; 264/328.1; 425/149

(58) Field of Classification Search
USPC .......... 264/40.1, 40.5, 328.1, 328.17, 328.19; 425/145, 149
See application file for complete search history.

(56) References Cited

U.S. PATENT DOCUMENTS 3,870,445 A 3/1975 Hold et al.
3,937,776 A 2/1976 Hold et al.
(Continued)

FOREIGN PATENT DOCUMENTS

DE 102005037268 A1 2/2006
EP 0225134 A2 6/1987
(Continued)

OTHER PUBLICATIONS

PCT International Search Report, Zoran Novakovic, Jun. 15, 2010, 3 pages.

*Primary Examiner* — Jill Heitbrink
(74) *Attorney, Agent, or Firm* — Husky Intellectual Property Services

(57) ABSTRACT

There is provided a method (300) of controlling melt pressure at a filter outlet (113) of a melt filter (112) in an injection unit (100) having an extruder (102) that is connectable to a melt accumulator (122) via the melt filter (112), the melt filter (112) being associated with a target melt pressure range, the method executable at a controller (126) associated with the injection unit (100), the method (300) comprising: appreciating (310) an indication of an actual melt pressure associated with the melt filter (112); responsive to the actual melt pressure not being within the target melt pressure range, determining (320) a remedial parameter that is instrumental in bringing the actual melt pressure within the target melt pressure range; releasing (330) a control signal to execute an action associated with the remedial parameter, thereby causing the actual melt pressure to fall within the target melt pressure range.

11 Claims, 3 Drawing Sheets

U.S. PATENT DOCUMENTS

| | | | |
|---|---|---|---|
| 4,094,940 | A | 6/1978 | Hold |
| 4,311,446 | A | 1/1982 | Hold et al. |
| 4,390,332 | A | 6/1983 | Hendry |
| 5,158,725 | A | 10/1992 | Handa et al. |
| 5,246,660 | A * | 9/1993 | Tsutsumi ................. 264/328.17 |
| 6,196,820 | B1 * | 3/2001 | Straka ............................ 425/84 |
| 6,241,932 | B1 | 6/2001 | Choi et al. |
| 6,514,440 | B1 | 2/2003 | Kazmer et al. |
| 6,558,603 | B2 | 5/2003 | Wobbe et al. |
| 6,821,101 | B2 | 11/2004 | Kohler et al. |
| 7,004,616 | B2 | 2/2006 | Murakami et al. |
| 7,411,163 | B2 | 8/2008 | Gneuss |
| 2004/0082690 | A1 | 4/2004 | Kawahara et al. |
| 2008/0290538 | A1 | 11/2008 | Biesenberger |

FOREIGN PATENT DOCUMENTS

| | | |
|---|---|---|
| JP | 59098829 A | 6/1984 |
| JP | 63031731 A | 2/1988 |
| JP | 3023922 A | 1/1991 |
| JP | 2004050427 A | 2/2004 |
| JP | 2008229859 A | 10/2008 |
| WO | 2006125037 A2 | 11/2006 |

* cited by examiner

INJECTION UNIT HAVING A FILTER, A METHOD OF CONTROLLING MELT PRESSURE IN ACCORDANCE WITH A TARGET PRESSURE RANGE

TECHNICAL FIELD

The present invention generally relates to, but is not limited to molding of molded articles and more specifically, but not limited to, a method of controlling melt pressure in accordance with a target pressure range.

BACKGROUND

Molding is a process by virtue of which a molded article can be formed from molding material (such as Polyethylene Teraphalate (PET), Polypropylene (PP) and the like) by using a molding system. Molding process (such as injection molding process) is used to produce various molded articles. One example of a molded article that can be formed, for example, from PET material is a preform that is capable of being subsequently blown into a beverage container, such as, a bottle and the like.

A typical injection molding system includes inter alia an injection unit, a clamp assembly and a mold assembly. The injection unit can be of a reciprocating screw type or of a two-stage type. Within the reciprocating screw type injection unit, raw material (such as PET pellets and the like) is fed through a hopper, which in turn feeds an inlet end of a plasticizing screw. The plasticizing screw is encapsulated in a barrel, which is heated by barrel heaters. Helical (or other) flights of the screw convey the raw material along an operational axis of the screw. Typically, a root diameter of the screw is progressively increased along the operational axis of the screw in a direction away from the inlet end.

As the raw material is being conveyed along the screw, it is sheared between the flights of the screw, the screw root and the inner surface of the barrel. The raw material is also subjected to some heat emitted by the barrel heaters and conducted through the barrel. As the shear level increases in line with the increasing root diameter, the raw material, gradually, turns into substantially homogenous melt. When a desired amount of the melt is accumulated in a space at discharge end of the screw (which is an opposite extreme of the screw vis-à-vis the inlet end), the screw is then forced forward (in a direction away from the inlet end thereof), forcing the desired amount of the melt into one or more molding cavities. Accordingly, it can be said that the screw performs two functions in the reciprocating type injection unit, namely (i) plasticizing of the raw material into a substantially homogeneous melt and (ii) injecting the substantially homogeneous melt into one or more molding cavities.

The two stage injection unit can be said to be substantially similar to the reciprocating type injection unit, other than the plasticizing and injection functions are separated. More specifically, an extruder screw, located in an extruder barrel, performs the plasticizing functions. Once a desired amount of the melt is accumulated, it is transferred into a melt accumulator, which is also sometimes referred in the industry as a "shooting pot", the melt accumulator being equipped with an injection plunger, which performs the injection function.

SUMMARY

According to a first broad aspect of the present invention, there is provided a method of controlling melt pressure at a filter outlet of a filter in an injection unit having an extruder that is connectable to a melt accumulator via the filter, the filter being associated with a target melt pressure range, the method executable at a controller associated with the injection unit, the method comprising: appreciating an indication of an actual melt pressure associated with the melt filter; responsive to the actual melt pressure not being within the target melt pressure range, determining a remedial parameter that is instrumental in bringing the actual melt pressure within the target melt pressure range; releasing a control signal to execute an action associated with the remedial parameter, thereby causing the actual melt pressure to fall within the target melt pressure range.

According to a second broad aspect of the present invention, there is provided an injection unit comprising an extruder that is connectable to a melt accumulator via a filter, the filter being associated with a target melt pressure range, the filter including a filter inlet and a filter outlet and a filtering member located therebetween; a controller associated with the injection unit, the controller being configured to: appreciate an indication of an actual melt pressure associated with the melt filter; responsive to the actual melt pressure not being within the target melt pressure range, determine a remedial parameter that is instrumental in bringing the actual melt pressure within the target melt pressure range; release a control signal to execute an action associated with the remedial parameter, thereby causing the actual melt pressure to fall within the target melt pressure range.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
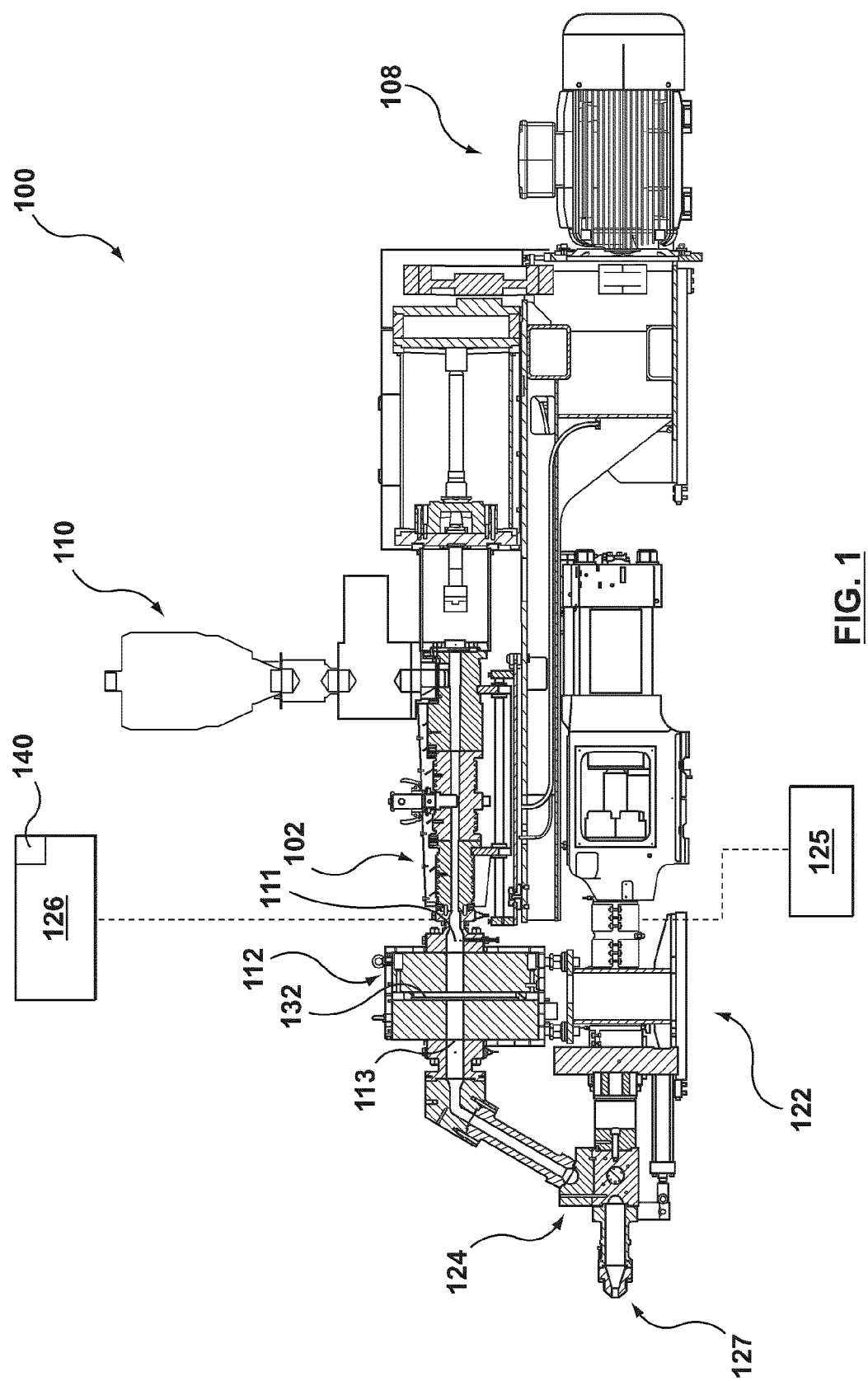
FIG. 1 depicts a partially sectioned front view of an injection unit implemented according to a non-limited embodiment of the present invention.
Figure 2:
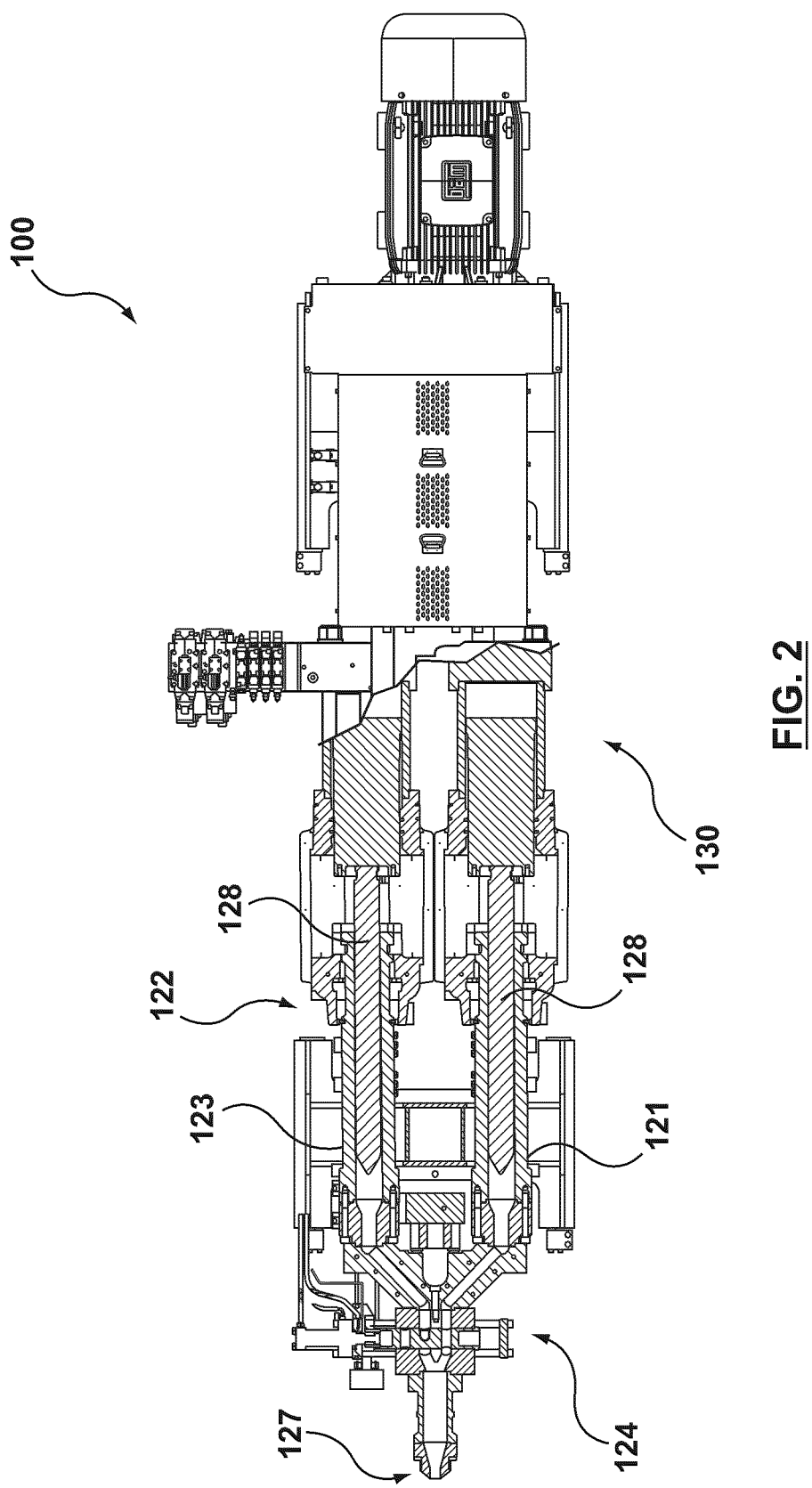
FIG. 2 depicts a partially sectioned top view of the injection unit of FIG. 1.

With reference to FIG. 1 and FIG. 2, an injection unit 100 implemented in accordance with non-limiting embodiments of the present invention, will now be described in greater detail, in which figures, FIG. 1 depicts a partially sectioned frontal view of the injection unit 100 and FIG. 2 depicts a partially sectioned top view of the injection unit 100.

Within the instantly illustrated embodiment, the injection unit 100 is of a two-stage type and to that extent, the injection unit 100 comprises an extruder 102 and a melt accumulator 122. The extruder 102 houses a screw (not depicted) for plasticizing raw material, as will be described in greater detail herein below. In some embodiments of the present invention, the extruder 102 can be implemented as a twin screw extruder and, to that end, the extruder 102 can house a set of two screws (not visible). The extruder 102 (or to be more precise, the screw within the extruder 102) is actuated by a screw actuator 108. In the specific non-limiting embodiment of the present invention, the screw actuator 108 comprises an electric motor coupled to the extruder 102 via a gear box (not separately numbered); however, this need not be so in every embodiment of the present invention. As such, it should be appreciated that the screw actuator 108 can be implemented differently, such as a hydraulic actuator, a mechanical actuator or a combination thereof. It should be noted that in alternative non-limiting embodiments, the injection unit 100 can be implemented as a single-stage injection unit with a reciprocating screw.

In some embodiments of the present invention, the extruder 102 can operate in a continuous plasticizing manner (i.e. extruder 102 can be implemented as a continuous extruder). In other embodiments, the extruder 102 can operate in a near continuous plasticizing manner. In yet further embodiments, the extruder 102 can operate in an interrupted plasticizing manner (especially so, when the extruder 102 is implemented as a reciprocating-type unit).

In the specific non-limiting embodiment depicted herein, the screw actuator 108 imparts a rotational movement onto the screw of the extruder 102 and it is this rotational movement that performs a dual function: (a) plasticizing of the raw material and (b) transfer of the raw material into the melt accumulator 122, as will be described in greater detail herein below. As such, within this implementation, the screw of the extruder 102 is not associated with a reciprocal movement. In alternative embodiments, however, which are particularly applicable but not limited to scenarios where a single screw is employed in the extruder 102, the screw of the extruder 102 can be associated with the reciprocal movement, which can be imparted by the screw actuator 108 or by separate means (not depicted).

The injection unit 100 further includes a material feeder 110. The material feeder 110 is configured to supply raw material to the extruder 102. The material feeder 110 can be configured as a controlled (or metered) feeder or as a continuous feeder.

In a specific non-limiting embodiment of the present invention, the raw material is PET. In alternative embodiments, other materials or a mix of materials can be used. In a particular implementation of the embodiments of the present invention, the raw material includes a combination of virgin raw material and recycled raw material, in a particular proportion. The virgin raw material (which can come in a form of pellets, for example) and the recycled raw material (which can come in a form of flakes, for example) can be mixed at the material feeder 110 or at another upstream device (not depicted), such as a drier (not depicted), for example.

In a particular scenario, the raw material fed through the material feeder 110 may include 25% of the recycled raw material and 75% of the virgin raw material. In another particular scenario, the raw material may include 50% of the recycled raw material and 50% of the virgin raw material. In yet another particular scenario, the raw material may include 75% of the recycled raw material and 25% of the virgin raw material. Naturally, the exact combination of the raw material used can be different. It should be further noted that embodiments of the present invention can be applied to the injection unit 100 that processes only virgin raw material or only recycled raw material.

In addition to the material feeder 110, in some embodiments of the present invention, there may be provided an additive feeder (not depicted) for adding additional substances, such as for example colorants, acetaldehyde (AA) blockers and the like, to the extruder 102. Such additive feeders are well known in the art and, as such, will not be described here at any length.

Within the specific non-limiting embodiment being depicted herein, the melt accumulator 122 is implemented as a dual melt accumulator and to that extent the melt accumulator 122 can include two instances of the melt accumulator 122—a first melt accumulator 121 and a second melt accumulator 123, selectively fluidly coupled to the extruder 102, as will be described in greater detail herein below. In alternative non-limiting embodiments of the present invention, the melt accumulator 122 can include only a single instance of the melt accumulator 122.

Each of the first melt accumulator 121 and the second melt accumulator 123 includes an injection plunger 128 operatively disposed within the respective one of the first melt accumulator 121 and the second melt accumulator 123. The injection plunger 128 is actuated by a respective one of an injection plunger actuator 130, which in this particular embodiment of the present invention is implemented as a piston which actuates the injection plunger 128 via hydraulic means. Within these embodiments, the injection plunger actuator 130 may be associated with a servo-valve (not depicted) or other compressible fluid flow control means for controlling the flow rate of compressible fluid used for actuation of the injection plunger actuator 130. However, in alternative non-limiting embodiments of the present invention, the injection plunger 128 can be actuated by a different type of an actuator (not depicted), such as mechanical actuator, electrical actuator and the like.

There is also provided a distribution assembly 124, located fluidly-in-between the extruder 102 and the melt accumulator 122. The distribution assembly 124 is implemented as a distribution valve and is configured to selectively fluidly connect:

- (a) the extruder 102 to the first melt accumulator 121 while connecting the second melt accumulator 123 to a nozzle 127, which provides for fluid communication with a molding cavity (not depicted) either directly or via a melt distribution system (not depicted), such as a hot runner (not depicted) for enabling for melt transfer from the extruder 102 to the first melt accumulator 121 and melt injection from the second melt accumulator 123 into the molding cavity (not depicted) via the nozzle 127;
- (b) the extruder 102 to the second melt accumulator 123 while connecting the first melt accumulator 121 to the nozzle 127, for enabling for melt transfer from the extruder 102 to the second melt accumulator 123 and melt injection from the first melt accumulator 121 into the molding cavity (not depicted) via the nozzle 127.

There is also provided a melt filter 112, located fluidly in-between the extruder 102 and the melt accumulator 122. The purpose of the melt filter 112 is to filter impurities and other foreign matters from the plasticized material being transferred from the extruder 102 to the melt accumulator 122. The specific implementation for the melt filter 112 is not specifically limited and, as an example, an off-the-shelf filter from Gneuss Inc. of Matthews, N.C. (www.gneuss.com) can be used to implement the melt filter 112.

The melt filter 112 comprises a filter inlet 111 for allowing an inflow of molding material to be filtered and a filter outlet 113 to allow for an outflow of the filtered molding material. The melt filter 112 further comprises a filtering member 132 located in-between a pair of locating plates (not numbered), which are in turn located between the filter inlet 111 and filter outlet 113. The melt filter 112 can also be associated with a drool outlet (not depicted) for allowing material that is used for backflushing the melt filter 112 to drool out. In some embodiments of the present invention, the filtering member 132 can be implemented as a rotational filtering member 132 with a backflush option.

In some embodiments of the present invention, the melt filter 112 can be said to be associated with a pressure range requirement, the pressure range requirement being indicative of a pressure range required to be maintained at the filter outlet 113. Generally speaking, the lowermost value for the pressure range requirement may be selected to allow locating plates (not numbered) that are used to house the rotational filtering member 132 therebetween to provide sufficient separation to allow for the rotational filtering member 132 to rotate for purging of the contaminants. Alternatively or additionally, the target pressure requirement may have an upper limit selected for safe operation of the melt filter 112. Alternatively or additionally, the target pressure requirement may be selected to allow to fill a purging chamber (not depicted) with a volume of molding material that is used for backflushing of the melt filter 112.

In some embodiments of the present invention, the pressure range requirement can be at least 30 bars. In other embodiments of the present invention, the pressure range requirement can be between 30 and 200 bars. Other ranges can be of course applicable, depending on a particular selection of the melt filter 112.

There is also provided a condition sensor, schematically depicted in FIG. 1, at 125. Generally speaking, the condition sensor 125 is configured to sense an indication of an actual melt pressure of the molding material, as it exits the filter outlet 113 of the melt filter 112.

In some embodiments of the present invention, the condition sensor 125 is implemented as a pressure transducer and is positioned in the melt stream downstream from the filter outlet 113. Within these embodiments, the condition sensor 125 directly senses melt pressure downstream of the filter outlet 113.

In alternative embodiments of the present invention, the condition sensor 125 is implemented as a pressure transducer and is positioned in the melt stream upstream of the filter inlet 111. Within these embodiments, the condition sensor 125 directly senses melt pressure upstream of the filter inlet 111. Within these embodiments, by appreciating the melt pressure upstream of the melt filter 112 and knowing a pressure drop associated with the melt filter 112, the melt pressure downstream of the filter outlet 113 can be determined by looking up in a look-up table, which correlates melt pressure upstream of the filter inlet 111 and melt pressure downstream of the filter outlet 113 for a given flow rate.

In yet further embodiments of the present invention, the condition sensor 125 is implemented as a pressure transducer associated with the injection plunger actuator 130. Within these embodiments, the condition sensor 125 senses pressure associated with a compressible fluid (such as oil and the like) used within the injection plunger actuator 130. Within these embodiments, by appreciating the pressure associated with the compressible fluid used in the injection plunger actuator 130 and knowing a ratio between the pressure of the compressible fluid and a melt pressure downstream of the filter outlet 113 (which can be determined for each of the injection unit 100, such as 1 to 5 or 1 to 10, etc), melt pressure downstream of the filter outlet 113 can be determined.

Naturally, other implementations for the condition sensor 125 are possible. For example, in those embodiments of the present invention, where the injection plunger actuator 130 is electric rather than hydraulic, the condition sensor 125 can be implemented as a strain gauge. Further implementations of the condition sensor 125 are also possible.

Also, provided within the architecture of FIG. 1 and FIG. 2 is a controller 126 (only depicted in FIG. 1 for the sake of simplicity). Controller 126 can be implemented as a general-purpose or purpose-specific computing apparatus that is configured to control one or more operations of the injection unit 100. It is also noted that the controller 126 can be a shared controller that controls operation of an injection molding machine (not depicted) that houses the injection unit 100 and/or other auxiliary equipment (not depicted) associated therewith.

Amongst numerous functions that can be controlled by the controller 126, some include (but are not limited to):
  (i) Controlling the screw actuator 108 and more specifically the speed of rotation of the screw (not depicted) of the extruder 102;
  (ii) Controlling the distribution assembly 124 for selectively implementing the melt transfer and melt injection switching between the two instances of the melt accumulator 122, as has been discussed above;
  (iii) Controlling the material feeder 110, where the material feeder 110 is implemented as controlled feeder, also referred to sometimes by those of skill in the art as a volumetric feeder;
  (iv) Controlling the above-mentioned additive feeder (not depicted) in those embodiments where such additive feeder is provided;
  (v) Receiving sensed operational parameters from the condition sensor 125;
  (vi) Controlling the above-mentioned servo-valve.

It should be noted that not all of these functions need to be performed by the controller 126 in each and every embodiment of the present invention. For that matter, in some embodiments, the controller 126 may not need to perform some of these functions.

The controller 126 can comprise internal memory 140 configured to store one or more instructions for executing one or more routines. The internal memory 140 can also store and/or update various parameters, such as but not limited to:
  (i) an indication of a pressure range requirement associated with the melt filter 112;
  (ii) the above-mentioned look-up table, which correlates melt pressure upstream of the filter inlet 112 and melt pressure downstream of the filter outlet 113 for a given flow rate;
  (iii) an indication of the ratio between the pressure of the compressible fluid and a melt pressure downstream of the filter outlet 113;
  (iv) an indication of a pressure drop between the filter inlet 111 and the filter outlet 113;
  (v) an adjustment look-up table (to be described in greater detail herein below).

Figure 3:
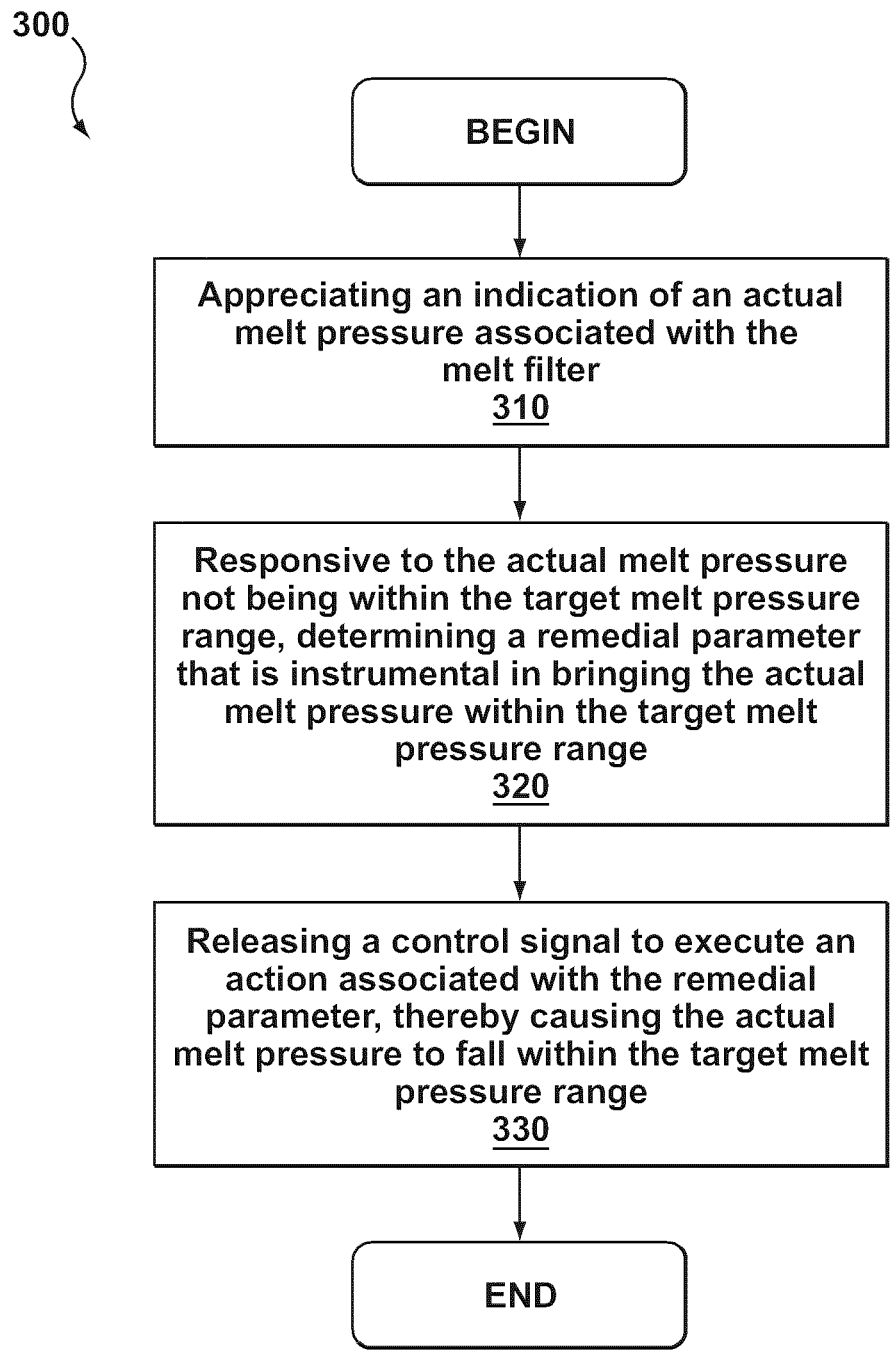
FIG. 3 depicts a flow chart showing steps of a non-limiting embodiment of a method for controlling melt pressure within the injection unit of FIG. 1 and FIG. 2.

Given the architecture described with reference to FIG. 1 and FIG. 2, it is possible to execute a method 300 for controlling a melt flow in a system having the melt filter 112. Within embodiments of the present invention, the controller 126 can execute the method for controlling the melt flow. FIG. 3 depicts a flow chart of steps associated with a non-limiting embodiment of the method 300. It is recalled that an indication of the target pressure range can be stored in the internal memory 140 and it assumed that such indication has been stored in the internal memory 140.

Step 310—Appreciating an Indication of an Actual Melt Pressure Associated with the Filter The method 300 begins at step 310, where controller 126 appreciates an indication of an actual melt pressure associated with the melt filter 112.

In those embodiments of the present invention, where the condition sensor 125 is implemented as a pressure transducer and is positioned in the melt stream downstream from the filter outlet 113, the controller 126 received an indication of the melt pressure measured downstream of the filter outlet 113.

In those embodiments of the present invention, where the condition sensor 125 is implemented as a pressure transducer and is positioned in the melt stream upstream of the filter inlet 111, the controller 126 appreciates an indication of the melt pressure upstream of the filter inlet 111. The controller 126 then appreciated a pressure drop associated with the melt filter 112 (for example, by retrieving it from the internal memory 140), the controller 126 determines the melt pressure downstream of the filter outlet 113.

In those embodiments of the present invention, where the condition sensor 125 is implemented as a pressure transducer associated with the injection plunger actuator 130, the controller 126 appreciates an indication of the pressure associated with a compressible fluid (such as oil and the like) used within the injection plunger actuator 130. The controller 126 then appreciates a ratio between the pressure of the compressible fluid and a melt pressure downstream of the filter outlet 113 (for example, by retrieving it from the internal memory 140) and, based on the ratio, determines the melt pressure downstream of the filter outlet 113.

Step 320—Responsive to the Actual Melt Pressure not being within the Target Melt Pressure Range, Determining a Remedial Parameter that is Instrumental in Bringing the Actual Melt Pressure within the Target Melt Pressure Range The method 300 then proceeds to step 320, where controller 126, responsive to the actual melt pressure not being within the target melt pressure range, determines a remedial parameter that is instrumental in bringing the actual melt pressure within the target melt pressure range.

More specifically, the controller 126 first retrieves the indication of the target melt pressure range, which can be retrieved, for example, from the internal memory 140. The controller 126 then, compares, the indication of the actual melt pressure appreciated as part of step 310 to the target melt pressure range. Based on this comparison, the controller 126 then determines the remedial parameter. For example, if the actual pressure is lower then the lowermost point within the target melt pressure range, the controller 126 determines that the remedial parameter is instrumental for increasing of the actual melt pressure. Within this scenario, the remedial parameter may be instrumental in causing a restriction of the amount of compressible fluid exiting a cylinder associated with the injection plunger actuator 130, thus increasing the resistance to the molding material entering the melt accumulator 122, thereby effectively increasing melt pressure downstream of the filter outlet 113. In those embodiments of the present invention, where a servo-valve (not depicted) is used to control the outflow of the compressible fluid, the remedial parameter may be instrumental in controlling that servo-valve.

How the controller 126 determines the exact degree of the remedial parameter (i.e. for example, by how much to restrict the amount of the compressible fluid exiting the cylinder associated with the injection plunger actuator 130) is not particularly limited. In some embodiments of the present invention, the controller 126 can determine the exact degree of the remedial parameter based on a proportional-integral-derivative (PID) algorithm. Alternatively, the controller 126 may store an adjustment look-up table in the internal memory 140, the adjustment look-up table may correlate a given value of the current melt pressure to a corresponding degree of the remedial parameter (for example, a value representative of how much to adjust the flow of the compressible fluid, etc). The adjustment look-up table can be populated, for example, by conducting empirical studies or by running various simulations and populating the content of the adjustment look-up table and storing same in the internal memory 140.

In alternative non-limiting embodiments of the present invention, remedial parameter may be instrumental in adjusting temperature of the molding material (for example decreasing the temperature to make the molding material more viscous in response to the actual pressure being below the target melt pressure range). In yet further alternative non-limiting embodiments, the remedial parameter can be instrumental in adjusting the injection pressure associated with the extruder 102 (for example increasing the injection pressure in response to the actual pressure being below the target melt pressure range). Other types of remedial parameters are of course possible.

Step 330—Release a Control Signal to Execute an Action Associated with the Remedial Parameter, Thereby Causing the Actual Melt Pressure to Fall within the Target Melt Pressure Range The method 300 then proceeds to step 330, where the controller 126 releases a control signal to execute an action associated with the remedial parameter, thereby causing the actual melt pressure to fall within the target melt pressure range.

For example, in the above-mentioned example of a servo-valve and the remedial action being restriction of the amount of compressible fluid exiting a cylinder associated with the melt accumulator 122, the control signal so released may be instrumental in controlling the servo-valve to restrict the flow of compressible fluid.

In some embodiments of the present invention, the method 300 then loops back to step 310, at which point it continues to monitor for an indication of an actual melt pressure associated with the melt filter. Within these embodiments of the present invention, the method 300 can be executed at each molding cycle or at any other appropriate time interval.

An Optional Enhancement

In some embodiments of the present invention and optionally, as part of executing step 320, the controller 126 may further compare the indication of the current melt pressure with the up-most limit of the target melt pressure range. Responsive to the controller 126 determining that the actual melt pressure is above the target melt pressure range, the controller 126 may determine a security remedial action, which in this case may be opposite to the remedial action described above. For example, the security remedial action may be instrumental to increase the flow of the compressible fluid exiting the cylinder of the melt accumulator 122, completely un-restricting the flow or inducing a "positive pullback". This will in turn cause decrease of the actual melt pressure downstream of the filter outlet 130 with the goal of bringing the actual melt pressure within the target melt pressure range.

A technical effect of embodiments of the present invention includes ability to control melt pressure associated with the melt filter 112 substantially in real-time. This, in turn, allows for continuous operation of the injection unit 100 without having to stop operation thereof for adjusting the melt pressure. In other words, execution of method 300 allows for purging of the melt filter 112 at any time during operation of the injection unit 100.

The description of the embodiments provides examples of the present invention, and these examples do not limit the scope of the present invention. The concepts described above may be adapted for specific conditions and/or functions, and may be further extended to a variety of other applications that are within the scope of the present invention. Having thus described the embodiments, it will be apparent that modifications and enhancements are possible without departing from the concepts as described. Therefore, what is to be protected by way of letters patent are limited only by the scope of the following claims:

What is claimed is:

1. A method (300) of controlling melt pressure at a filter outlet (113) of a melt filter (112) in an injection unit (100) having an extruder (102) that is connectable to a melt accumulator (122) via the melt filter (112), the melt accumulator (122) having an injection plunger actuator (130), the melt filter (112) being associated with a target melt pressure range, the method executable at a controller (126) associated with the injection unit (100), the method (300) comprising:

appreciating (310) an indication of an actual melt pressure associated with the filter outlet (113);

responsive to the actual melt pressure not being within the target melt pressure range, determining (320) a remedial parameter that is instrumental in bringing the actual melt pressure within the target melt pressure range;

releasing (330) a control signal, the control signal based on the remedial parameter, the control signal configured to execute an action associated with the remedial parameter, thereby causing the actual melt pressure at the filter outlet (113) to fall within the target melt pressure range, the control signal for controlling the amount of compressible fluid exiting a cylinder associated with the injector plunger actuator (130).

2. The method (300) of claim 1, wherein the injection unit (100) further comprises a condition sensor (125) and wherein said appreciating (310) comprises receiving the indication from the condition sensor (125).

3. The method (300) of claim 2, where said condition sensor (125) is a pressure transducer positioned downstream from the filter outlet (113) and wherein said indication is result of direct sensing of melt pressure downstream of the filter outlet (113).

4. The method (300) of claim 2, wherein said condition sensor (125) is a pressure transducer positioned upstream from a melt filter inlet (111) and wherein said indication comprises melt pressure indicator upstream of the filter inlet (111) and wherein the method (300) further comprises:

appreciating an indication of a pressure drop associated with the melt filter (112);

based on the melt pressure indicator upstream of the filter inlet (111) and the pressure drop, determining melt pressure downstream of the filter outlet (113).

5. The method (300) of claim 2, wherein said condition sensor (125) is a pressure transducer configured to measure pressure of a compressible fluid associated with an injection plunger actuator (130) of the melt accumulator (122) and wherein said indication comprises melt pressure indicator of the compressible fluid and wherein the method (300) further comprises:

appreciating an indication of a ratio between the pressure of the compressible fluid and melt pressure downstream of the filter outlet (113);

based on the ratio and the pressure of the compressible fluid; determining melt pressure downstream of the filter outlet (113).

6. The method (300) of claim 1, wherein the actual melt pressure is under the target melt pressure range and wherein the remedial parameter comprises increasing the actual melt pressure.

7. The method of claim 6, wherein the melt accumulator (122) is associated with an injection plunger actuator (130) having compressible fluid flow control means, and wherein remedial action is instrumental for causing the compressible fluid flow control means to restrict flow of a compressible fluid exiting the injection plunger actuator (130).

8. The method of claim 6, wherein remedial action is further instrumental for causing increase in injection pressure associated with the extruder (102).

9. The method of claim 6, wherein remedial action is further instrumental for causing decrease of temperature associated with molding material.

10. The method (300) of claim 1, further comprising, responsive to the actual melt pressure being above the target melt pressure range, performing a security remedial action.

11. An injection unit (100) comprising:

an extruder (102) that is connectable to a melt accumulator (122) via a melt filter (112), the melt accumulator (122) having an injection plunger actuator (130), the melt filter (112) being associated with a target melt pressure range, the melt filter (112) including a filter inlet (111) and a filter outlet (113) and a filtering member (132) located therebetween;

a controller (126) associated with the injection unit (100), the controller being configured to:

appreciate an indication of an actual melt pressure associated with a filter outlet (113);

responsive to the actual melt pressure not being within the target melt pressure range, determine a remedial parameter that is instrumental in bringing the actual melt pressure within the target melt pressure range;

release a control signal, the control signal based on the remedial parameter, the control signal configured to execute an action associated with the remedial parameter, thereby causing the actual melt pressure at the filter outlet to fall within the target melt pressure range, the control signal for controlling the amount of compressible fluid exiting a cylinder associated with the injection plunger actuator (130).

* * * * *